United States Patent [19]

Decock et al.

[11] Patent Number: 4,909,286

[45] Date of Patent: Mar. 20, 1990

[54] METHOD FOR REGULATING THE SUPPLY OF WEFT THREAD ON WEAVING MACHINES, AND A DEVICE WHICH USES THIS METHOD

[75] Inventors: Bernard Decock, Wevelgem; Marc Wyffels, Ieper; Frank Ampe, Leffinge-Middelkerke; Philippe Van Bogaert, Schaarbeek, all of Belgium

[73] Assignee: Picanol N.V., Ieper, Belgium

[21] Appl. No.: 269,650

[22] Filed: Nov. 10, 1988

[30] Foreign Application Priority Data

Nov. 12, 1987 [BE] Belgium ............................... 8701271

[51] Int. Cl.$^4$ ............................................. D03D 47/36
[52] U.S. Cl. .................................................... 139/452
[58] Field of Search .............................. 139/452, 435; 242/47.01, 47.12, 47.13

[56] References Cited

U.S. PATENT DOCUMENTS

| | | | |
|---|---|---|---|
| 4,586,543 | 5/1986 | Volland et al. | 139/452 |
| 4,716,943 | 1/1988 | Yoshida et al. | 139/452 |
| 4,799,517 | 1/1989 | Bucher | 139/452 |

FOREIGN PATENT DOCUMENTS

| | | |
|---|---|---|
| 2512213 | 10/1976 | Fed. Rep. of Germany . |
| 2508501 | 12/1982 | France . |
| 2548693 | 1/1985 | France . |
| WO84/00158 | 4/1985 | World Int. Prop. O. . |

OTHER PUBLICATIONS

Traca-de-Almeida et al., "Rate Dividers Adjust Motor Speed Ratios", *Electronic Design*, vol. 31, No. 15, Jul. 1983, pp. 2328-2329.

*Primary Examiner*—Henry S. Jaudon
*Attorney, Agent, or Firm*—Bacon & Thomas

[57] ABSTRACT

A method for regulating the supply of weft thread on weaving machines includes the steps of winding the weft thread from a thread supply by means of a draw-off roller driven by a motor, supplying the thread to an accumulator, and controlling the draw-off roller motor by a pulse train generated on the basis of a set value and a second pulse train whose frequency is proportional to the main shaft of the weaving machine. By adjusting the set value, the speed of the draw-off roller can be adjusted to account for such factors as thread type, thickness extensibility and diameter, and also thread supply package diameter and variations in thread draw-off speed. A device for implementing the method of the invention includes, in a preferred embodiment, a cam, a set value setting unit, a shaft pulse generator for generating the second pulse train, a buffer, and a counter which adds the set value and the second pulse train to generate the first pulse train.

13 Claims, 6 Drawing Sheets

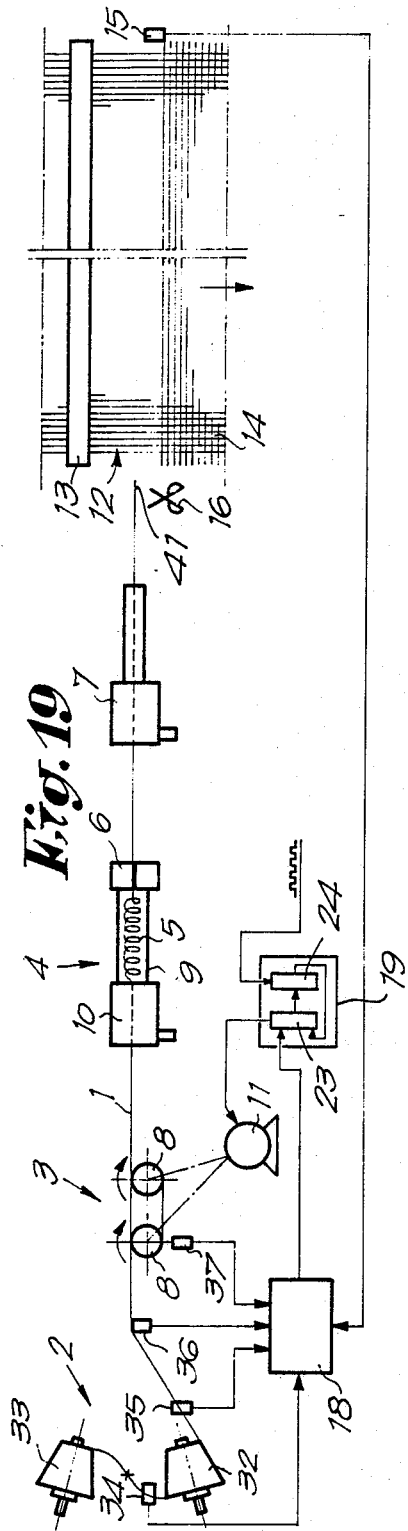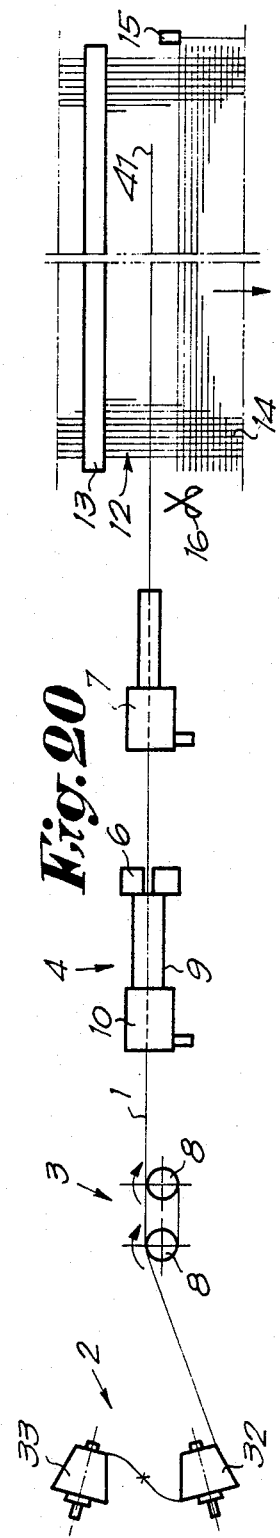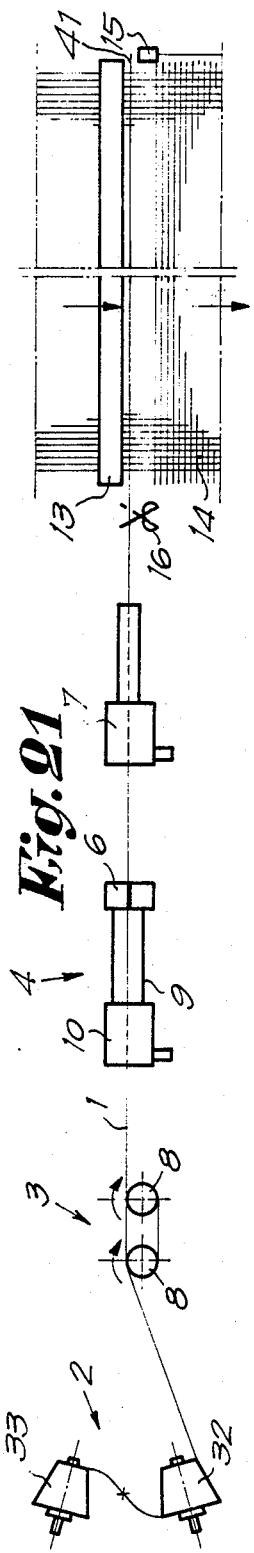

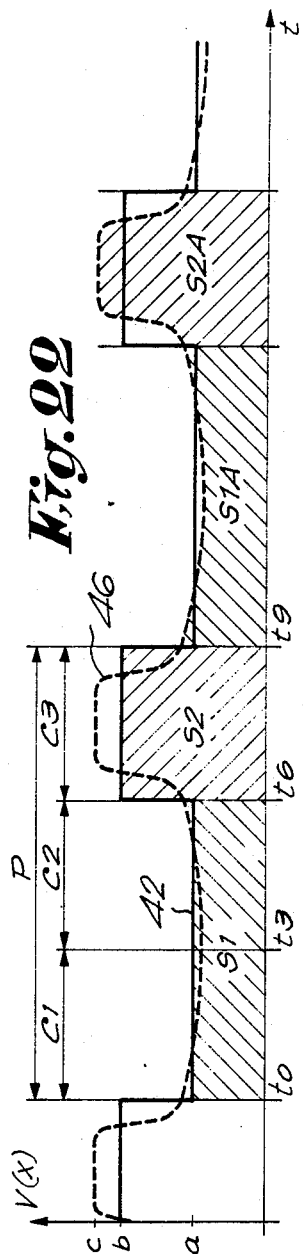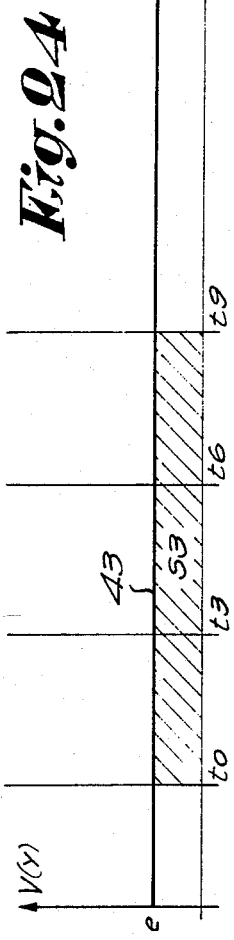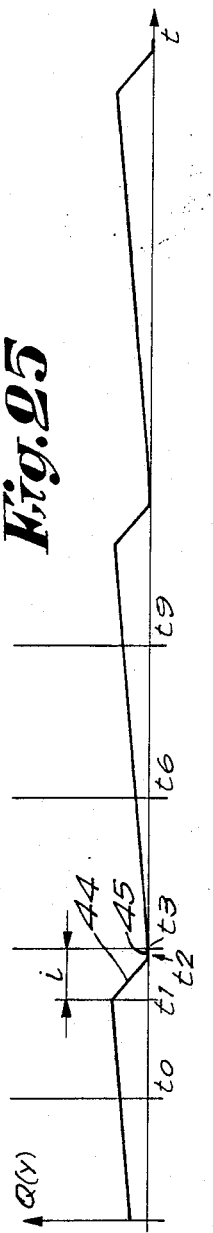

METHOD FOR REGULATING THE SUPPLY OF WEFT THREAD ON WEAVING MACHINES, AND A DEVICE WHICH USES THIS METHOD

BACKGROUND OF THE INVENTION

This invention concerns a method for regulating the supply of weft thread on weaving machines, and also a device which uses this method. In particular, the invention concerns a method and device applicable to weaving machines in which the weft yarn is taken from a yarn supply by means of a yarn draw-off device driven by a motor and consisting of at least one yarn draw-off roller.

A weft preparation mechanism for weft threads is known from French patent application No. 2.508.501, in which use is made of yarn draw-off rollers, an accumulator device and a thread clip for controlling the insertion of the weft thread into the shed. In this mechanism the yarn draw-off rollers are coupled mechanically to the main shaft of the weaving machine. The speed of the yarn draw-off rollers cannot be altered with respect to the speed of the main shaft of the weaving machine. Such a known device has the disadvantage that the insertion thread length cannot be regulated in a simple manner. It is useful to be able to adjust the speed of the yarn draw-off rollers for a number of reasons, for instance to suit the condition and the type of weft yarn supplied. For example, a weft thread drawn from a yarn supply is always under a certain tension, which can vary for various reasons, such as variation in the speed of the thread. Since the yarn draw-off rollers serve to measure off the weft yarn under tension, it is clear that the actual length of the weft yarn released from the yarn draw-off rollers will be smaller than the length measured off. Also, the variations in the tension of the weft yarn as it is drawn off the yarn package cause variations in the thickness of the thread, so that the effective winding diameter of the yarn draw-off rollers is also subject to variation, with the result that variations can also occur in the effective quantity of thread taken from the yarn supply.

SUMMARY OF THE INVENTION

The present invention has as its object a device and a method which do not have the above-mentioned disadvantages, and by means of which the yarn draw-off mechanism including the yarn draw-off rollers can be controlled in an optimum manner.

The present invention also concerns a method for regulating the supply of weft thread on weaving machines, in which the weft yarn is wound off from a yarn package by means of at least one yarn draw-off roller driven by a motor and fed to a weft accumulator device, characterized in that the motor of the yarn draw-off device is controlled by a train of pulses, where the speed of said motor is proportional to the frequency of said pulse train, and in which the the pulse train is generated on the basis of, on the one hand, a set value, and on the other hand, a signal which at any given moment is proportional to the speed of the main shaft of the weaving machine, such that the number of pulses delivered by the pulse train per revolution of the main shaft of the weaving machine is in proportion to said set value. The method according to the invention offers the advantage that the speed of the yarn draw-off roll or rollers is proportional to the speed of the weaving machine, and also that corrections to the speed of the yarn draw-off rollers can be made in a suitable manner by altering said set value or by letting said value vary according to a particular function.

In a variant of the invention, in addition to the yarn draw-off device being controlled as described above, the thread clip for inserting the weft thread is also controlled in accordance with the above-mentioned method.

In a special application, the method is used for adjusting the insertion length on weaving machines. In particular use is made of an insertion device in which the weft thread is led from a yarn package to the insertion device along, respectively, a yarn draw-off mechanism having at least one yarn draw-off roller, a device for forming an accumulation of thread, and a thread clip. The insertion device may for example be a main injector nozzle. The present invention also includes the step of commanding the thread clip at fixed set points of time in the weaving cycle and controlling the drive of the yarn draw-off device in such a way that, between each successive insertion of the same weft yarn, in the corresponding device for forming an accumulation of thread a thread accumulation is formed whose length is smaller than the length required for one pick, the drive continuing to be operated further in such a way that precisely one length of thread necessary for insertion is drawn off by the yarn draw-off device between two successive closings of the thread clip.

The invention also concerns devices which use the method according to the invention; these are described in more detail below.

BRIEF DESCRIPTION OF THE DRAWINGS

In order to explain the characteristics of the invention, the following preferred embodiments are described, by way of example only and without being limitative in any way, with reference to the accompanying drawings, where:

FIGS. 19 to 21 show the steps of operation of the present invention, for a particular variant;

FIGS. 22 to 25 show a number of diagrams relating to the particular method applied in FIGS. 19 to 21;

DESCRIPTION OF THE PREFERRED EMBODIMENTS

Figure 1:
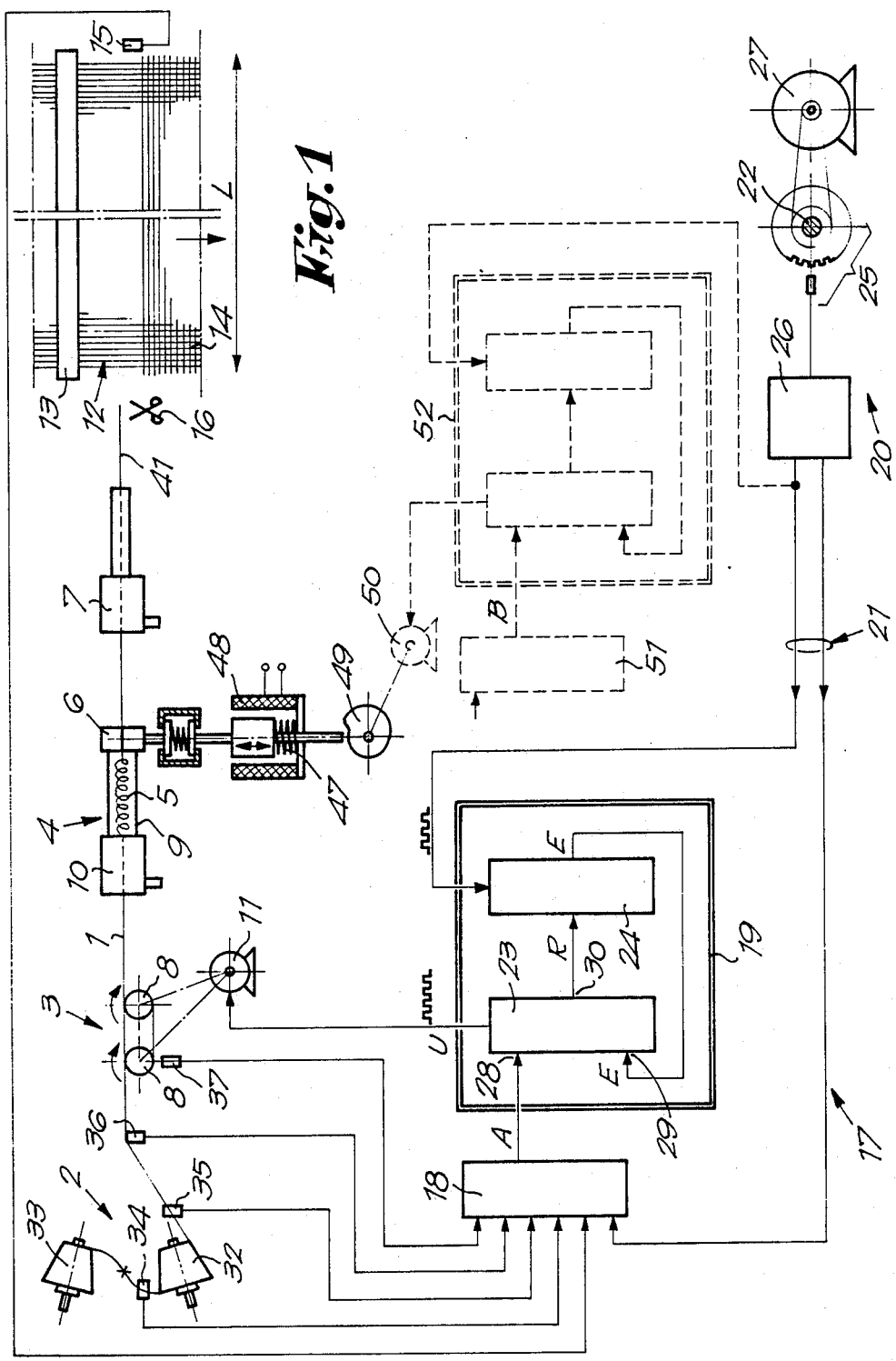
FIG. 1 is a schematic representation of the device according to the invention.

FIG. 1 is a schematic representation of an insertion device on a weaving machine, in which the weft yarn 1 is led from the yarn supply 2 to a thread insertion mechanism 7 along, respectively, a yarn draw-off device 3, a device 4 for forming a thread accumulation 5 and a thread clip 6. In the embodiment shown, the yarn draw-off device 3 consists of two yarn draw-off rollers 8. The device 4 shown for forming a thread accumulation 5 may for example be of the type in which the weft thread 1 is laid spirally against the inside wall of a tube 9 by means of a blower 10. The thread injection mechanism 7 is formed by a main injector nozzle etc.

Also shown in FIG. 1 are the drive 11 of the thread draw-off device 3, the shed 12, the reed 13, the woven cloth 14, a weft stop motion 15 and a cutter 16.

One particular feature of the invention is that at least the drive of the motor 11 of the yarn draw-off roller 8, which preferably consists of a stepper motor, is controlled according to the method mentioned in the preamble, e.g. by means of the device 17 as shown in FIG. 1 and described in detail below.

For this purpose, the device 17 includes, in addition to the yarn draw-off device 3 and its drive 11 already mentioned above, a setting unit 18, an arithmetic unit 19, and a mechanism 20 which provides a signal 21 which at each moment is proportional to the speed of the weaving machine, in particular the speed of the main shaft 22.

The setting unit 18 provides a set value A, the setting of which is described in more detail further on. The arithmetic unit 19 is designed so that at the output U, to which is connected the drive 11, a pulse train is supplied, generated on the basis of the set value A and the above-mentioned signal 21, such that the number of pulses delivered at the output U per revolution of the main shaft 22 is equal to, or possibly a multiple of, said value A. In order to achieve this, the arithmetic unit 19 consists of a counter 23 and a buffer 24, whose operation is described in more detail further on.

The mechanism 20 which provides the signal 21 is formed by a pulse generator 25 which is mounted on the main shaft of the weaving machine and which generates a fixed number of pulses per revolution, and a frequency multiplier 26, such that the signal 21 consists of a pulse train with a constant number of pulses per revolution of the main shaft 22. This number is henceforth referred to as Z. Also shown schematically in FIG. 1 is the main drive 27 of the weaving machine.

The counter 23 has two inputs 28 and 29, and is designed so that the values which appear at the two inputs are summed and the result R passed from the output 30 to the buffer 24. The logic of the counter 23 is such that each time the sum obtained in the counter 23 is greater or equal to the value Z, one pulse is supplied at the output U, and in this case the sum present in the counter is reduced by Z. In other words, if the value of the sum is exactly equal to the value Z the result R=0 is obtained, while if the sum is greater than the value Z the result R supplied to the buffer 24 is equal to the remainder in the counter.

The buffer 24 passes the value R from its input to its output each time a pulse of the signal 21 is supplied to the clock input. The output E of the buffer is fed back to the counter 23, in particular to input 29. The above-mentioned set value A is supplied to input 28.

The operation of the arithmetic unit 19 is further illustrated by the table which follows the description. For the sake of simplicity, low numbers have been chosen for the values A and Z in the table. In the example, A=4 and Z=16. As shown in the table, in the initial state A=4, the output of the buffer E=0 and the result R at the counter is equal to 4. At the moment a pulse of the signal 21 arrives at the buffer 24, the value R is passed to the input 29 of the counter 23. For example R=A+E=4+4=8. A similar reasoning applies to subsequent pulses. As already described, each time the sum in the counter reaches the value Z=16, an output pulse is supplied to the output U.

From the foregoing it is clear that for every Z pulses supplied to the buffer 24, A pulses are supplied to the drive 11. It is also clear that the frequency of the pulse train supplied to the drive 11 is at each moment proportional to the revolution of the main shaft 22. Also, by altering the value A corrections can be made to the number of pulses supplied to the drive 11, in order to regulate the quantity of weft yarn 1 drawn off.

Figure 2:
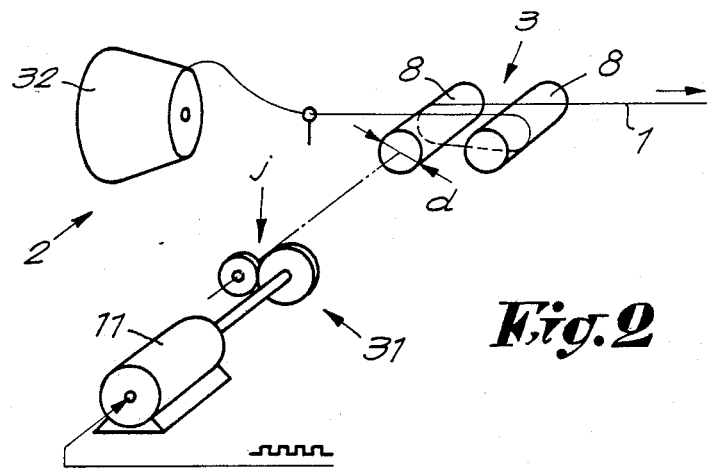
FIG. 2 shows a part of the device in FIG. 1.

From FIG. 1 it is clear that in the case where the yarn draw-off rollers 8 turn with constant speed, the value A must be equal to the number of pulses which have to be supplied to the drive 11 in order to wind off a length of weft thread L equal to the weaving width. In the theoretical case, when the disturbance functions which occur in practice are not taken into account, the value A can simply be calculated or determined beforehand, as further illustrated in FIG. 2. As shown in FIG. 2 the drive of motor 11 is coupled to the draw-off rollers 8 by means of a transmission 31. The transmission 31 has a transmission ratio j. The yarn draw-off rollers have a diameter d.

In order to wind off one unit of length, $K/\pi X dx$; pulses are necessary at the motor 11, where K represents the number of pulses necessary to make the motor 11 carry out one revolution.

For a length L, it is therefore necessary to have $KxL/\pi XdXj$ pulses; in other words:

$$A = KXL/\pi Xdxj,$$

at least when operating with a constant yarn draw-off speed.

Figure 3:
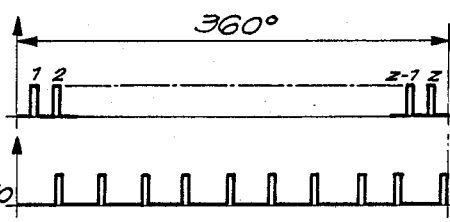
FIGS. 3 to 6 and 7 to 10 are diagrams showing the relationship between a number of signals which occur in the device.
Figure 4:
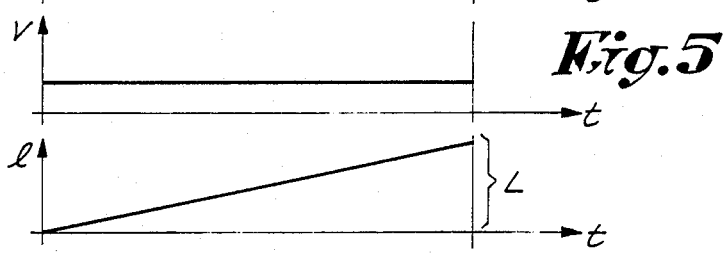
Figure 5:
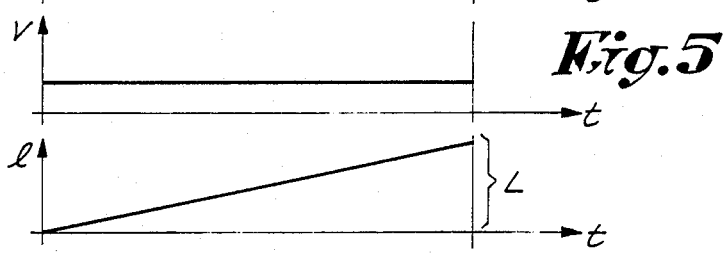
Figure 6:
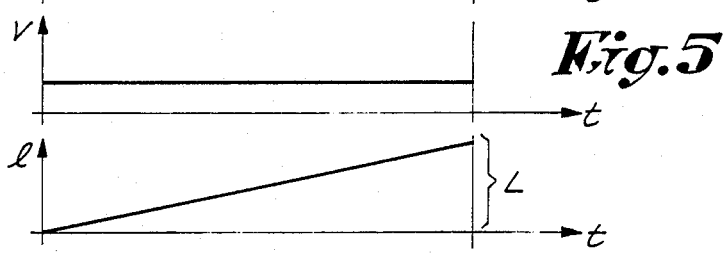
Figure 7:
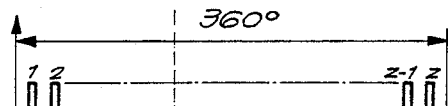
Figure 8:

In order to illustrate the operation of the device 17, four curves are shown in FIGS. 3 to 6, where respectively FIG. 3 represent the signal 21, FIG. 4 represents the pulse train supplied to the drive 11 in the case where A=10 and A remains constant during one complete revolution of the main axis 22, FIG. 5 represents the speed of the yarn draw-off rollers 8 and FIG. 6 represents the corresponding quantity of thread or thread length 1 which has passed through the yarn draw-off mechanism 3 from the beginning of the corresponding cycle. FIGS. 3 and 4 show clearly that for every Z pulses of the signal 21, ten pulses are supplied to the motor 11 per revolution of the main shaft 22. Since the signal 21 here is a regular pulse train, or in other words since the speed of the main shaft 22 remains constant, clearly also the pulses in FIG. 4 are supplied at constant time intervals.

Figure 9:
Figure 10:

FIGS. 7 to 10 show similar curves for the case in which the value A increases at time t =M during a cycle of revolution of the main shaft 22. From FIG. 8 it can be clearly seen that at moment M the frequency of the pulse train supplied to the drive 11 of the yarn draw-off mechanism 3 follows this variation proportionately. FIG. 9 shows how the speed of the yarn draw-off rollers 8 increases proportionately, and FIG. 10 shows how the thread quantity or thread length 1 increases in proportion.

It is therefore clear that should the set value A be altered, more or less pulses are supplied to the motor 11, so that the quantity of weft thread drawn off the package 32 per unit time alters, or in other words so that more or less yarn is wound off.

Thanks to the use of the device 17 described for this purpose, the method and the device according to the invention are particularly suited to making allowance for the condition and type of the weft yarn supplied during weft yarn preparation, and for a number of parameters of the insertion mechanism used.

For example, it is always the case that the weft thread drawn from a yarn package is under a certain tension, which varies for various reasons such as variation in the speed of the thread. Since the yarn draw-off rollers 8 measure off the weft thread 1 under tension, it is obvious that the weft yarn leaving the yarn draw-off rollers will have an effective length smaller than the length measured off, as a result of contraction of the thread. Furthermore, as a result of the tension variations in the weft yarn drawn off the yarn package, variations in the thickness of the thread also occur, so that the effective winding diameter of the yarn draw-off rollers 8 also undergoes variations, with the result that deviations occur in the effective quantity of thread drawn off.

Figure 12:
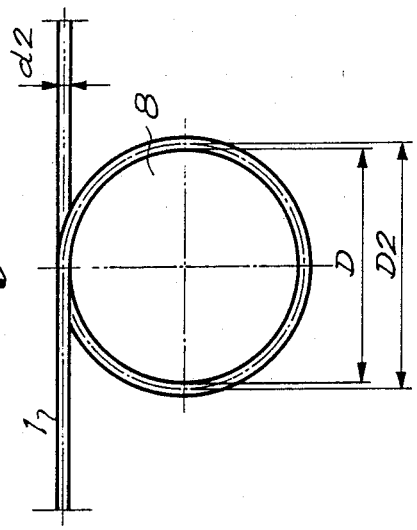
FIGS. 11 and 12 show the effect of variations of the tension in the weft yarn at the yarn draw-off rollers.
Figure 11:
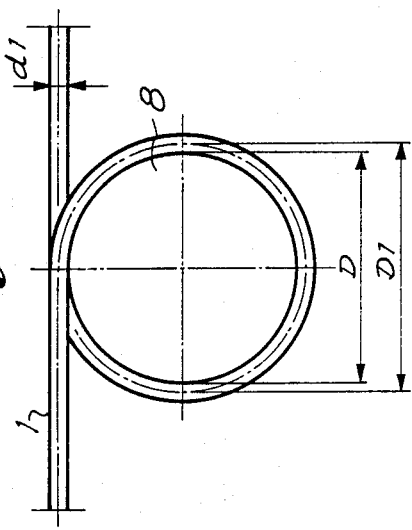

FIGS. 11 and 12 illustrate the effect just described which the alterations in the thickness of the weft yarn 1 have on the winding off process of the yarn draw-off mechanism 3. In FIG. 11 a weft yarn 1 with a yarn thickness d1 is wound off by means of a simple yarn draw-off roller 8 with a diameter of D. The effective winding diameter of course amounts to D1, and thus for each revolution a yarn quantity of XD1 is drawn off. On the other hand, if as shown in FIG. 12 the yarn thickness is d2, where d2 is smaller than d1, then clearly the effective winding diameter D2 will be smaller than said effective winding diameter D1, so that for each revolution less thread will be wound off.

It is clear that, according to the present invention, the variation just described, as well as other variations, can be simply taken into account by processing said variations in the setting unit 18 and from them calculating the optimum value of A. For this purpose, the setting unit 18 can use various parameters, such as the transition between two packages 32 and 33 detected by a detector 34, and also the thickness of and the tension in the weft yarn 1 and the speed of the yarn draw-off rollers 8, which can for example be measured respectively by appropriate measuring devices 35, 36 and 37. When calculating the value A, it is also possible to take into account the characteristics of the yarn draw-off rollers 8, the effect of the speed of the weft yarn and of its accelerations, the diameter of the active package 32, which determines the yarn draw-off tension, the binding pattern and the free length of thread detected at the weft detector 15. On the basis of all the above-mentioned data, the yarn draw-off rollers 8 are controlled by means of the set value A so as to produce a compensating effect, and so that the effective thread length supplied corresponds to the actual thread length required.

The above-mentioned value A does not necessary have to be a fixed value which is modified according to the above-mentioned parameters. A predefined function for the value of A can for example also be put into the setting unit 18. This last is of particular importance when weaving with several weft threads, where the weaving machine has as many devices according to FIG. 1 as the number of different weft yarns being worked with. Since the time interval between two successive insertions of the same sort of weft yarn may be relatively large, the yarn draw-off rollers 8 are not activated continuously but are systematically activated and deactivated. In the present invention, this is done by letting the corresponding value A describe an appropriate function.

Figure 13:
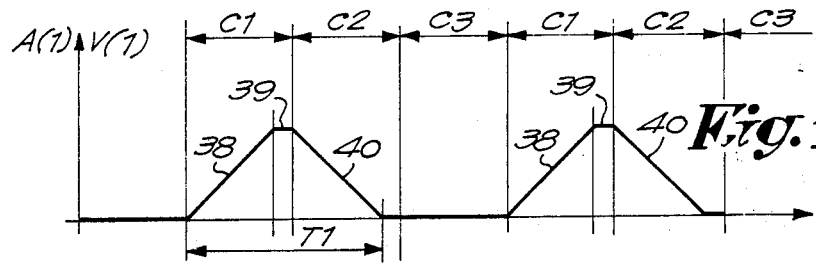
FIGS. 13 to 18 illustrate the setting of the above-mentioned set value when weaving with several threads.
Figure 14:
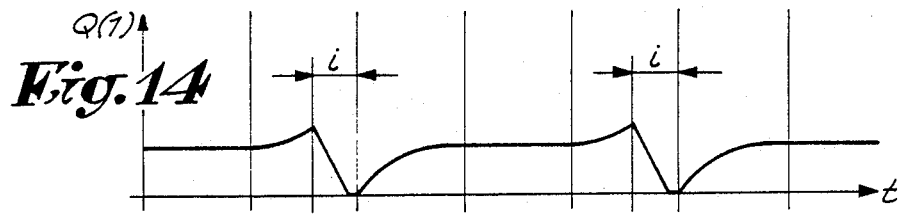
Figure 15:
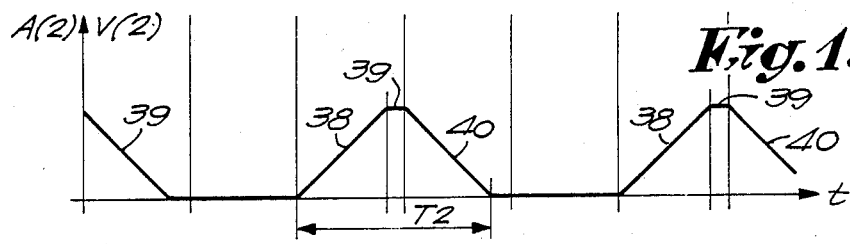
Figure 16:
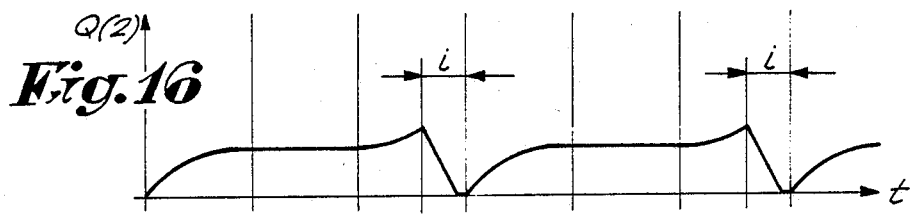
Figure 17:
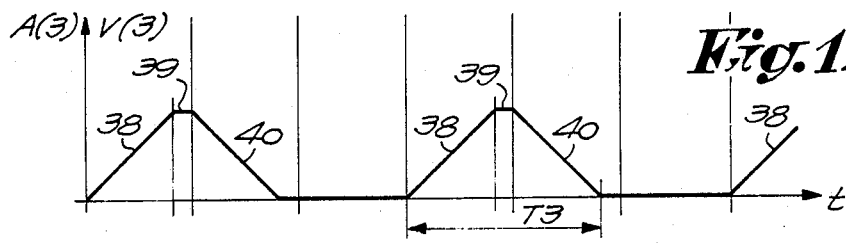

This operation is further illustrated by the diagrams in FIGS. 13 to 18, in which three weft yarns are being used. The diagrams in figs. 13, 15, 17 show respectively the curve of the values A(1), A(2) and A(3), i.e. for each of the three colours. The curves correspond to the respective velocities V(1), V(2) and V(3) of the respective motors 11 used for each of the three yarns. As shown in FIGS. 13, 15 and 17, the yarn draw-rollers are activated alternately at overlapping intervals, where each activation period T1, T2 and T3 is formed for example by a first phase 38 during which the yarn draw-off rollers 8 are gradually brought up to speed, a second phase 39 during which the yarn draw-off rollers 8 turn with constant speed, and a third phase 40 during which the yarn draw-off rollers 8 are gradually brought to a halt once more.

Since, at least in the example shown, an insertion i of one corresponding type of weft yarn occurs only once every three weaving cycles C1, C2 and C3, it is clear that each activation period T1, T2 and T3 can be greater than the one period C1 or C2 or C3 necessary for accomplishing a weaving cycle.

Figure 18:
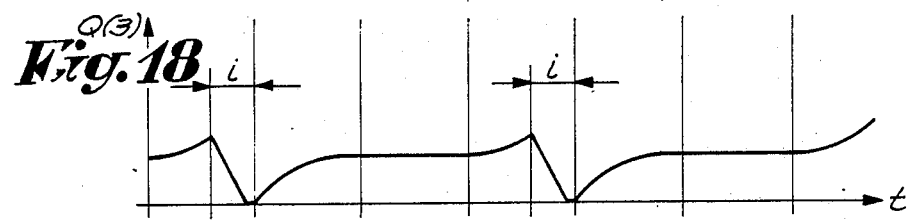

FIGS. 14, 16 and 18 show the curve of the quantity of thread in the tube 9 for the respective thread insertion mechanisms. During the periods i indicated, insertion is carried out and the corresponding tube is thus completely emptied.

The present invention also concerns a method for regulating the length of weft thread inserted into the shed, in which optimum control of the same is obtained by using the above-mentioned device 17. In order to achieve this, in the first instance the thread clip 6 is opened and closed at well-defined times in the weaving cycle, where these times can be set beforehand. The drive 11 of the yarn draw-off mechanism 3 is controlled so that, as shown in FIG. 19, with the thread clip 6 closed a thread accumulation 5 is first formed, which however is never greater than the length of thread required for one insertion. After the thread clip 6 is opened, as shown in FIG. 20 the thread accumulation 5 formed is released, so that the weft yarn 1 is brought with its leading end 41 into the shed 12. During the last phase of the insertion the thread supply of weft yarn 1 is taken directly from the yarn draw-off rollers 8, until the thread clip 6 closes, as shown in FIG. 21. Obviously the drive 11 should be controlled in such a way that when the thread clip 6 closes the leading end 41 of the weft yarn 1 must be located precisely at the receiving side of the shed 12, i.e. at the weft detector 15. Subsequently, after the beat-up movement of the reed 13, the length of weft thread inserted can be cut off by means of the cutter 16 in the conventional way.

FIGS. 22 to 25 show a number of diagrams illustrating the last-mentioned special application, when working with two weft threads X and Y, for example different colours. By way of example the period P of a weaving pattern repeat consists of three weaving cycles, where in the first weaving cycle C1 an insertion of weft yarn Y is carried out, while successive insertions of weft yarn X are carried out in cycles C2 and C3.

FIG. 22 also shows the velocity V(X) of the yarn draw-off mechanism of the weft yarn X, while FIG. 23 shows the quantity Q(X) of the above-mentioned thread accumulation 5. FIGS. 24 and 25 similarly show the values V(Y) and Q(Y).

The first insertion of colour X occurs between times t4 and t6, while the second occurs between times t7 and t9. For the first insertion, two cycles C1 and C2 are available for forming an accumulation Q(X) of one weft thread length, while for the second insertion only one cycle C2 is available. This also explains why during the first two cycles C1 and C2 the drive 11 of the yarn draw-off mechanism for weft thread X can operate at half velocity V(X) =a relative to the third cycle C3 where V(X)=b=2a.

For colour Y, only one insertion occurs for every three cycles, so that the yarn draw-off mechanism for this colour Y can run at constant velocity V(Y)=e, where e=⅓b.

Here it should be noted that areas S1 and S2 under the velocity curve 42 and the area S3 under the velocity curve 43 are representative of the quantity of weft thread released at the respective insertions. For ideal control of the drives 11 of the respective yarn draw-off mechanisms of the weft threads X and Y, S1=S2=S3.

It should also be noted that each insertion period i consists of two phases 44 and 45, where during phase 44 the thread accumulation 5 formed is carried into the shed 12, while during phase 45 thread insertion occurs directly from the corresponding yarn draw-off mechanism. The start and end of the insertion period Y are of course determined by respectively the opening and closing of the corresponding thread clip.

Note also that the velocity curve 42 in FIG. 22 is only the theoretical curve of the velocity V(X). It is also clear that this velocity V(X) will not actually jump suddenly at times t0, t6 and t9. A possible curve obtainable in practice is shown by the dotted line 46, where the maximum velocity V(X) =c in practice will actually be higher than said theoretical maximum velocity V(X) =b.

The curve 46 also shows the required variation of the value A, i.e. the function which must be inputted to the setting unit 18. Here it should be noted that for each pulse 21 coming from the main shaft 22 the setting unit 18 adjusts the value A.

It is obvious that the beginning and the end of each insertion period i are determined respectively by the moment of opening and closing of the corresponding thread clip 6.

Finally it should be noted that the areas S1A and S2A under the curve 46 in FIG. 22 in practice do not have to be equal to each other as are the above-mentioned areas S1 and S2 in the ideal case. It always happens that the yarn draw-off speed (c) for the preparation of each second insertion of the weft yarn X is greater than the yarn draw-off speed (a) for the preparation of each first insertion of the weft yarn X where, as is known, in the first case the thread diameter is usually decreased as a result of the higher draw-off tension. This in turn leads to the result (as already explained with the help of FIGS. 11 and 12) that the thread length actually drawn off is smaller than the measured-off length, so that in order to compensate for this it is necessary to operate at a higher speed than is theoretically required, thus giving rise to the difference in value between S1A and S2A.

Figure 26:
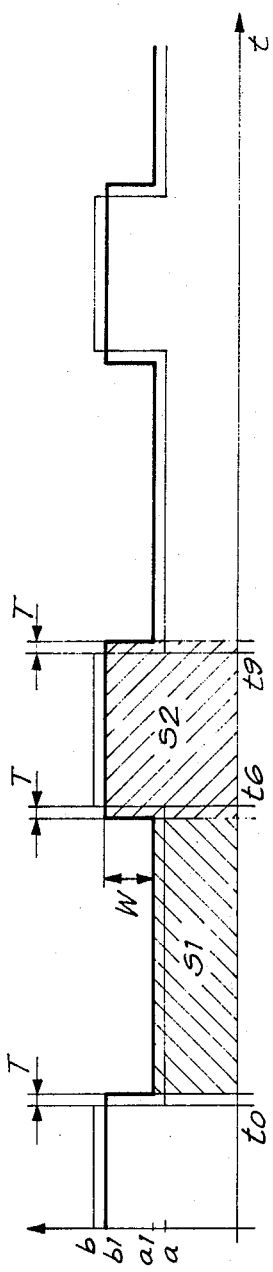
FIG. 26 shows a variant for the diagram shown in FIG. 22.

Since as constant a speed as possible of the drive 11 of the yarn draw-off mechanism 3 is sought, the difference in velocity between V(X) =a and V(X) =b is reduced as much as possible. As shown in FIG. 26 this is achieved by not having the two insertions of the colour X occur at the same point within their respective periods C2 and C3, but instead carrying out the first insertion earlier and the last insertion later, with displacements over a period T corresponding to five or so degrees of revolution. As a result, the base of the above-mentioned area S1 becomes shorter, while the base of the above-mentioned area S2 is lengthened, so that the speed a likewise increases to a1 and the speed b decreases to b1, so that the velocity V(X) is subject to a less great difference W=b1−a1 than was the case in the condition corresponding to FIG. 22.

By this means, not only is the drive 11 of the yarn draw-off mechanism 3 controlled according to the above-mentioned method, i.e. by means of the setting unit 18 and the arithmetic unit 19, but the thread clip 6 is also controlled in the same manner. This is shown by the dotted lines in FIG. 1.

The thread clip 6 is of the type which is pressed together by means of a spring 47 and which can be opened once more by energizing a solenoid 48. By means of a rotating cam 49 the thread clip 6 can be closed against the force of the solenoid 48 at a very precise time. The drive 50 of the cam 49 is provided by e.g. a stepper motor. The moment of closing of the thread clip 6 is set by using a setting unit 51 and an arithmetic unit 52 similar to the setting unit 18 and the arithmetic unit 19 of the drive 11 of the yarn draw-off rollers 8. Clearly, a suitable function for the set value B is read into the setting unit 51. By setting the value B it is relatively simple to set and modify the above-mentioned period T.

The present invention is not limited to the embodiment described above and shown in the accompanying drawings; on the contrary, such a method and device for regulating the supply of weft thread on weaving machines can be made in different variants while still remaining within the scope of the invention.

| CLOCK INPUT TO BUFFER (Z PULSES PER REV.) Z = 16 | SET VALUE A | BUFFER OUTPUT E | COUNTER OUTPUT R | PULSE TRAIN TO DRIVE 11 |
|---|---|---|---|---|
| START PULSE | | 4 | 0 | 4 |
| 1 | 4 | 4 | 8 | |
| 2 | 4 | 8 | 12 | |
| 3 | 4 | 12 | 16 + RESET | 1st PULSE |
| 4 | 4 | 0 | 4 | |
| 5 | 4 | 4 | 8 | |
| 6 | 4 | 8 | 12 | |
| 7 | 4 | 12 | 16 + RESET | 2nd PULSE |
| 8 | 4 | 0 | 4 | |
| 9 | 4 | 4 | 8 | |
| 10 | 4 | 8 | 12 | |
| 11 | 4 | 12 | 16 + RESET | 3rd PULSE |
| 12 | 4 | 0 | 4 | |
| 13 | 4 | 4 | 3 | |
| 14 | 4 | 8 | 12 | |

-continued

| CLOCK INPUT TO BUFFER (Z PULSES PER REV.) Z = 16 | SET VALUE A | BUFFER OUTPUT E | COUNTER OUTPUT R | PULSE TRAIN TO DRIVE 11 |
| --- | --- | --- | --- | --- |
| 15 | 4 | 12 | 16 + RESET | 4th PULSE |
| 16 | 4 | 0 | 4 | |
| | | | | (TOTAL = A) |

We claim:

1. A method for regulating the supply of weft thread on weaving machines, comprising the steps of winding the weft thread from a thread supply by means of at least one thread draw-off roller driven by a motor; supplying said thread to a device for forming a thread accumulation; controlling the motor of the thread draw-off roller by a first pulse train such that the speed of said motor is proportional to the frequency of said first pulse train; and generating the first pulse train on the basis of a set value and a signal comprising a second pulse train whose frequency at every moment is proportional to the speed of the main shaft of the weaving machine, such that the number of pulses supplied by said first pulse train per revolution of the main shaft of the weaving machine is proportional to said set value, said step of generating said first pulse train including the steps of generating, at the main shaft, said second pulse train with a constant number of pulses per revolution of the main shaft by means of a pulse generator and supplying the second pulse train as a clock pulse to a buffer; summing the values at an output of the buffer with said set value in a counter; comparing in the counter the value of the sum with the constant value of the number of pulses generated per revolution of the main shaft; placing, if the value of the sum in the counter is smaller than said constant value, the value of the sum at the input of the buffer; and, if the value of the sum in the counter is at least equal to the value of said constant value, then supplying a pulse from said pulse train to the drive of the thread draw-off roller and placing the difference in value of the sum and said constant value of the number of pulses generated per revolution of the main shaft at the input of said buffer.

2. A method as claimed in claim 1, wherein said set value is set as a function of a plurality of parameters relating to the condition and the type of the weft thread supplied to the thread draw-off roller.

3. A method as claimed in claim 2, wherein said parameters include the thickness of the weft thread.

4. A method as claimed in claim 2, wherein said parameters include the extensibility of the weft thread.

5. A method as claimed in claim 2, wherein said parameters include the contraction in diameter of the weft thread.

6. A method as claimed in claim 2, wherein said parameters include a package diameter of an active package.

7. A method as claimed in claim 2, wherein said parameters include the speed of the thread drawn from the package.

8. A method for regulating the supply of weft thread on weaving machines, comprising the steps of winding the weft thread from a thread supply by means of at least one thread draw-off roller driven by a motor; supplying said thread to a device for forming a thread accumulation; controlling the motor of the thread draw-off roller by a first pulse train such that the speed of said motor is proportional to the frequency of said first pulse train; and generating the first pulse train on the basis of a set value and a signal which at every moment is proportional to the speed of the main shaft of the weaving machine, such that the number of pulses supplied by said pulse train per revolution of the main shaft of the weaving machine is proportional to said set value; determining the end of the insertion by means of a thread clip whose moment of closing is determined by means of a cam mechanism which includes a cam; and further comprising the steps of:

controlling the drive of the cam by a second pulse train, wherein the speed of the cam is proportional to the frequency of said second pulse train, and wherein the second pulse train is generated on the basis of a second set value and a second signal which at each moment is proportional to the speed of the main shaft of the weaving machine, such that the number of pulses supplied by the second pulse train at the drive of the cam per revolution of the main shaft of the weaving machine is proportional to said second set value.

9. A method for regulating the supply of weft thread on weaving machines, comprising the steps of winding the weft thread from a thread supply by means of at least one thread draw-off roller driven by a motor; supplying said thread to a device for forming a thread accumulation; controlling the motor of the thread draw-off roller by a pulse train such that the speed of said motor is proportional to the frequency of said pulse train, and generating the pulse train on the basis of a set value and a signal which at every moment is proportional to the speed of the main shaft of the weaving machine such that the number of pulses supplied by said pulse train per revolution of the main shaft of the weaving machine is proportional to said set value, and further comprising the steps of:

controlling a thread clip at fixed, set times in the weaving cycle and controlling the drive of the yarn draw-off mechanism by causing the set value to describe a function during weaving in such a way that between each successive insertion of the same weft thread into a corresponding mechanism for forming the thread accumulation, a thread accumulation is formed whose length is smaller than the length required for the insertion, and further controlling the drive of the yarn draw-off mechanism by means of the set value in such a way that between two successive moments of closing the thread clip, exactly one length of thread required for the insertion is drawn off by the yarn draw-off mechanism.

10. A device for regulating the supply of weft thread on weaving machines, comprising a thread supply and a thread draw-off mechanism arranged to operate with the thread supply and which includes thread draw-off rollers driven by a pulse-controlled motor; a setting unit arranged to provide a set value; a mechanism arranged to operate with the main shaft of the weaving machine and generate a signal comprising a second pulse train whose frequency at each moment is proportional to the speed of the main shaft; and an arithmetic unit arranged to generate a first pulse train which is supplied to said pulse-controlled motor, said first pulse train being derived from said set value and said signal such that the number of pulses of the first pulse train supplied to the motor of the thread draw-off mechanism per revolution of the main shaft of the weaving machine is proportional to said set value, said mechanism arranged to operate with the main shaft including a pulse generator arranged to generate a signal consisting of said second pulse train having a constant number of pulses per revolution of the main shaft, wherein the frequency of the second pulse train at each moment is proportional to the speed of said main shaft, and wherein the arithmetic unit includes a buffer whose clock pulse is supplied by said second pulse train and a counter with two inputs, said counter arranged to sum the values at both inputs and compare this sum with a constant value which is equal to the number of pulses generated per revolution of the main shaft, and, each time said sum is at least equal to said constant value, providing one pulse for the first pulse train supplied to the drive of the yarn draw-off mechanism; said counter being coupled via an output to the input of the buffer such that the value of the sum is placed at the input of the buffer if said value is smaller than said constant value, and such that a value is supplied to the buffer equal to the difference between the value of said sum and said constant value used as a basis of comparison if the sum is not less than the constant comparison value.

11. A method for regulating the supply of weft thread on weaving machines, comprising the steps of winding the weft thread from a thread supply by means of at least one thread draw-off roller driven by means of a motor; supplying said thread to a device for forming a thread accumulation; controlling the motor of the thread draw-off roller by a first pulse train, the speed of said motor being proportional to the frequency of said first pulse train, and generating the first pulse train on the basis of a set value and a signal comprising a second pulse train whose frequency at every moment is proportional to the speed of the main shaft of the weaving machine, such that the number of pulses supplied by said pulse train per revolution of the main shaft of the weaving machine is proportional to said set value, said step of generating said first pulse train including the steps of generating, at the main shaft, said second pulse train with a constant number of pulses per revolution of the main shaft by means of a pulse generator and supplying the second pulse train as a clock pulse to an arithmetic unit; supplying the set value to said arithmetic unit; generating the first pulse train at the output of said arithmetic unit and supplying said first pulse train to the drive of the draw-off roller; and summing said set value in said arithmetic unit each time a pulse of said second pulse train is supplied to said arithmetic unit; and adding a pulse to said pulse train generated by said arithmetic unit each time said sum exceeds the value of said number of pulses per revolution of the main shaft.

12. A method for regulating the supply of weft thread on weaving machines, comprising the steps of winding the weft yarn from a yarn supplied by means of at least one yarn draw-off roller driven by means of a motor; supplying said thread to a device for forming a thread accumulation; determining the end of the insertion according to the moment of closing of a thread clip, the moment of closing being determined by means of a cam mechanism including a cam; controlling the drive of the cam by a pulse train such that the speed of the cam is proportional to the frequency of said pulse train; and generating the pulse train on the basis of a set value and a signal which at each moment is proportional to the speed of the main shaft of the weaving machine such that the number of pulses supplied by the pulse train at the drive of the cam per revolution of the main shaft of the weaving machine is proportional to said set value.

13. A device for regulating the supply of weft thread on weaving machines, wherein weft thread is wound from a thread supply by means of at least one yarn draw-off roller driven by a motor and supplied to a device for forming a thread accumulation, comprising a thread clip arranged such that the moment of closing of the thread clip determines the end of insertion, the moment of closing being determined by means of a cam mechanism including a cam; drive means for driving the cam and arranged to be controlled by a pulse train such that the speed of the cam is proportional to the frequency of said pulse train; and means for generating the pulse train on the basis of a set value and a signal which at each moment is proportional to the speed of the main shaft of the weaving machine such that the number of pulses supplied by the pulse train to said drive means per revolution of the main shaft of the weaving machine is proportional to said set value.

* * * * *